Nov. 21, 1933.  R. R. SEARLES  1,935,958
SPRING CONNECTION
Filed April 13, 1929
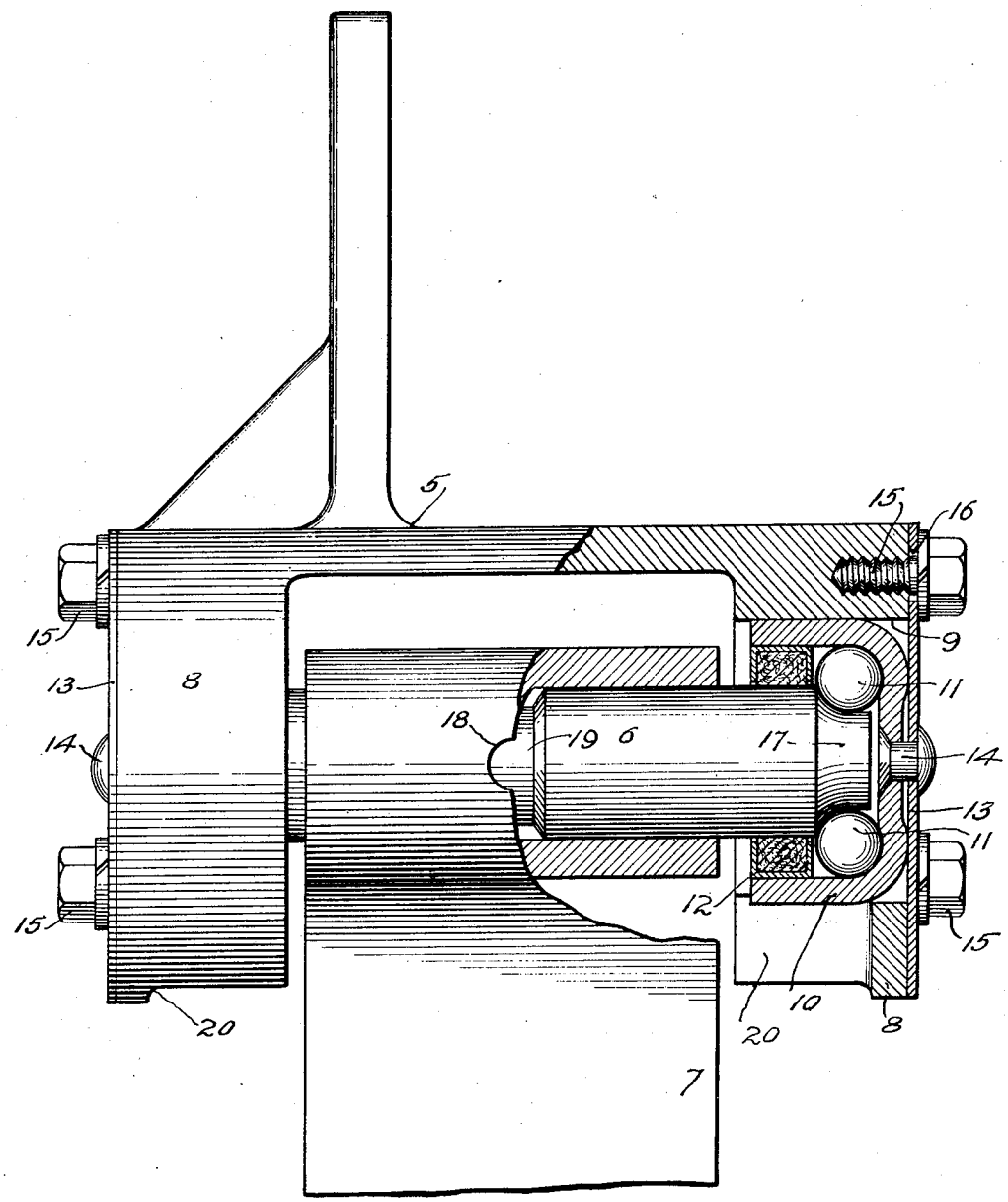
INVENTOR
Raymond R. Searles
BY
Mitchell Bechert
ATTORNEYS.

Patented Nov. 21, 1933

1,935,958

UNITED STATES PATENT OFFICE 1,935,958

SPRING CONNECTION

Raymond R. Searles, New Britain, Conn., assignor to The Fafnir Bearing Company, New Britain, Conn., a corporation of Connecticut Application April 13, 1929. Serial No. 354,719

10 Claims. (Cl. 267—54)

My invention relates to a spring end connection for connecting the frame and spring of a vehicle and more particularly to a so-called hinge end for connecting a frame and spring.

It is an object of the invention to provide an improved spring end connection of the character indicated, relatively simple in construction, cheap to manufacture, and effective and serviceable in use.

It is another object to provide an improved hinge end connection which may be readily assembled and disassembled.

It is a further object to provide a spring end connection capable of yielding slightly so as to take up excessive side strains.

Other objects and features of invention will appear as the specification proceeds.

In the drawing is shown, for illustrative purposes only, a fragmentary view of a spring and frame held together by a connection embodying features of the invention.

In the particular form illustrated, the end of the spring is connected to the frame. Ordinarily, the spring eye carries a pin, while the frame carries antifriction bearing means for supporting the pin or equivalent means. It is to be understood that the pin means or its equivalent could be carried by the main frame of the vehicle, and the supporting means carried by an auxiliary frame on the spring.

In the particular form illustrated, 5 indicates what may be termed a frame or auxiliary frame which will usually be carried by the frame of a motor vehicle. 6 indicates, by way of example, a pin which in this case is carried by the spring 7 and is adapted to be supported by the frame 5. The frame 5 is provided with spaced apart bosses 8—8, and since these bosses and parts appurtenant thereto may be and preferably are duplicates of each other, a description of one boss and adjacent parts will suffice for both.

Each boss 8 is provided with a bore 9 in alignment with the corresponding bore in the opposite boss. Within the bore is an antifriction bearing member raceway (in this case an outer raceway or cup 10) preferably fitting the bore 9 quite snugly. Balls 11 are carried by the raceway 10 and in the particular form shown the balls may be held in place by a spacer (not shown) and dust ring 12, or the raceway 10 may be substantially completely filled with balls so as to prevent radial inward displacement of the balls and the dust ring 12 may serve to prevent longitudinal or axial displacement. In either event, the balls or other antifriction bearing members are preferably unitarily carried by the raceway 10 so that the unit may be handled as such.

The raceway 10 is held in place by a retaining member such as a plate 13 engaging the outer side of the boss 8. The plate 13 is preferably rigidly secured to the raceway 10 by suitable means such as rivet 14, screw or by spot welding. Cap screws or the like 15 screwed into the boss 8 pass axially through apertures 16 in the plate 13 and serve to hold the latter together with the raceway 10 in place. The apertures 16 are preferably larger than the screws 15 so that the screws have no function in locating the radial position of the plate and raceway member 10. In some cases it might be possible to locate the raceway member 10 radially by means of screws 15, but, generally speaking, it is preferable to locate the raceway 10 radially by a snug fit in the bore 9 rather than by the retaining plate and screws. The plate 13, while it may be rigid and stiff, is preferably somewhat resilient so that when excessive side strains and absorbing shocks that may occur either in assembling or during road use the plate 13 may flex slightly and thus relieve the strain or shock.

This flexing is possible because the outer end of the raceway member 10 engages the plate 13 at a portion of the latter sufficiently remote from the screws 15, or in other words, near the center.

The pin 6 or its equivalent carries or has formed directly thereon at each end a raceway 17 for engagement with the antifriction bearing members 11. As illustrated, the balls 11 take both radial and end thrusts so that the weight of the car as well as side thrusts are carried directly by the balls and there are substantially no rubbing surfaces in contact to cause squeaks.

The spring end connection as illustrated may be very easily assembled and disassembled. In order to assemble the connection, the spring 7 together with the pin 6 is moved into the position shown in the drawing. Ordinarily, the pin 6 is rigidly held in the spring eye by any suitable means which may include a set screw (not shown) passing through the aperture 18 and taking into a necked portion 19 in the eye. When the pin 6 is thus assembled with the spring, it is preferable to provide the bosses with passages 20 to permit the necessary transverse movement of the pin 6 into the position shown in the drawing. With the spring and pin 6 in place, the bearing cups 10 are slipped into the bores 9 longitudinally until the antifriction bearing members, such as the balls 11, engage the raceways 17. The screws 15 are then passed through the apertures 16 and set up tightly so as to hold the spring and connection in assembled relation. Generally speaking the parts are so proportioned that when the balls fit their raceways properly the retaining plates 13 abut the bosses 8—8 but with a slightly flexible retaining plate slight inaccuracies in manufacture may be compensated for by flexing of the plate.

In order to disassemble the construction, it is only necessary to remove the screws 15 and by pulling the plate 13 outwardly longitudinally of the bore 9, the bearing cup 10 may be removed with it. This ease of removability is a valuable feature.

While the invention has been described in considerable detail and a preferred form shown, I do not wish to be strictly limited to the form nor details shown, since changes may be made within the scope of the invention as defined in the appended claims.

I claim:

1. In a spring connection, a frame having spaced apart bearing bosses, a bearing cup member supported in each of said bosses, entirely within the outer end thereof, a yieldable retaining plate member attached to each of said bearing cups, said plates abutting the outer ends of said bosses, said bearing members engaging said plates only at portions near the center of the same, means for securing said retaining plates to said bosses, antifriction bearing members in said bearing cup members, and complementary raceways engaging said antifriction bearing members.

2. In a spring end connection, a frame having spaced apart bosses, said bosses having aligned bores therein, a raceway member for antifriction bearing members supported in each of said bores, entirely inside of the outer end thereof a yieldable retaining member rigidly secured to each of said raceway members, said retaining members abutting the sides of said bosses, said bearing members engaging said plates adjacent to the central portion thereof only, means for securing said retaining members to said bosses, antifriction bearing members on said raceway members, and means extending between said bosses and having complementary raceways thereon for engaging said antifriction bearing members.

3. In a spring end connection, a frame having spaced apart bosses, said bosses having aligned bores therein, each bore having a raceway member housed entirely within the outer end thereof, a yieldable retaining and supporting member rigidly secured to each said raceway member, and means for securing said retaining members to the outside of said bosses, antifriction bearing members on said raceway members, said bearing members engaging said plates adjacent to the central portion thereof only and means extending between said raceway members and having complementary raceways thereon for engaging said antifriction bearing members.

4. In a spring connection, a frame having spaced apart bosses, said bosses having aligned bores therein, an antifriction raceway member in each said bore, a slightly yieldable retaining plate rigidly secured to each said raceway member and abutting the outer side of each said boss, means for securing said plates to the outside of said bosses, antifriction bearing members on said raceway members, and means extending between said bosses and having complementary raceways for engagement with said antifriction bearing members.

5. In a spring end connection, a frame having spaced apart bosses, said bosses having aligned bores therein, an antifriction bearing member raceway in each said bore, a flexible shock absorbing retaining plate rigidly secured to each said raceway and abutting the outside of each said boss, screw means passing through apertures in said plates and engaging into said bosses for securing said plates and raceways in place, said raceway member engaging said plate at a substantial distance from said screw means, antifriction bearing members on said raceways, and means extending between said bosses and having complementary antifriction raceways for engagement with said antifriction bearing members.

6. In a spring connection, a frame having a boss, a bore in said boss, an antifriction bearing member raceway in said bore, a flexible shock absorbing retaining member secured to said raceway substantially at the central zone thereof and abutting the outer side of said boss, means for securing said retaining member to said boss at the outer side thereof, said raceway member engaging said retaining member near the center only, antifriction bearing members on said raceway member, supporting means carrying a complementary antifriction raceway member for engagement with said antifriction bearing members, and means for sustaining said supporting means at the side opposite said boss.

7. In a spring connection, a frame having a boss with a bore therein, an antifriction bearing member raceway fitting within said bore, a flexible shock absorbing retaining plate engaging and secured to said raceway member adjacent the central portion only and abutting the outside of said boss, said plate having peripheral apertures therein, screws in said boss and passing through said apertures for holding said plate in place, said apertures in said plate being larger than said screws, antifriction bearing members on said raceway member, supporting means having a complementary raceway for engaging said antifriction bearing members, and means for sustaining said supporting means at the side opposite said boss.

8. In a spring end connection, a frame having spaced apart bearing bosses, a bearing raceway member supported in each of said bosses, means for yieldingly retaining said raceway members in said bosses and for closing the outer ends thereof, antifriction bearing members on said raceway members and complementary raceway means for engaging said antifriction bearing members.

9. In a spring end connection, a frame having spaced apart bearing bosses, a bearing raceway member in each of said bosses, a plate secured to each of said bosses for retaining said raceway members therein and for closing the outer ends of said bosses, said plates being resilient to permit slight yielding of said raceway members, antifriction bearing members on said raceway members and complementary raceway means engaging said antifriction bearing members.

10. In a spring connection, a frame having a bearing boss, a bearing raceway member supported by said boss, means for resiliently retaining said raceway member in said boss, antifriction bearing members on said raceway member, supporting means having a complementary raceway for engaging said antifriction bearing members, and means for sustaining said supporting means in the side opposite said boss.

RAYMOND R. SEARLES.